US011637610B2

(12) United States Patent
Akkarakaran et al.

(10) Patent No.: US 11,637,610 B2
(45) Date of Patent: Apr. 25, 2023

(54) TECHNIQUES FOR SPATIAL RELATION INDICATION BASED ON BEAM ORIENTATION

(71) Applicant: QUALCOMM Incorporated, San Diego, CA (US)

(72) Inventors: Sony Akkarakaran, Poway, CA (US); Tao Luo, San Diego, CA (US); Mahmoud Taherzadeh Boroujeni, San Diego, CA (US); Ling Ding, Chester, NJ (US); Jung Ho Ryu, Fort Lee, NJ (US); Junyi Li, Chester, NJ (US); Kapil Gulati, Belle Mead, NJ (US); Jelena Damnjanovic, Del Mar, CA (US); Hong Cheng, Basking Ridge, NJ (US)

(73) Assignee: QUALCOMM Incorporated, San Diego, CA (US)

(*) Notice: Subject to any disclaimer, the term of this patent is extended or adjusted under 35 U.S.C. 154(b) by 187 days.

(21) Appl. No.: 17/119,498

(22) Filed: Dec. 11, 2020

(65) Prior Publication Data
US 2021/0184747 A1    Jun. 17, 2021

Related U.S. Application Data

(60) Provisional application No. 62/948,032, filed on Dec. 13, 2019.

(51) Int. Cl.
*H04B 7/06*        (2006.01)
*H04B 7/0408*      (2017.01)
(Continued)

(52) U.S. Cl.
CPC ......... *H04B 7/0695* (2013.01); *H04B 7/0408* (2013.01); *H04B 7/0617* (2013.01);
(Continued)

(58) Field of Classification Search
CPC .. H04B 7/0695; H04B 7/0408; H04B 7/0617; H04B 7/088; H04W 16/28;
(Continued)

(56) References Cited

U.S. PATENT DOCUMENTS

2011/0201357 A1* 8/2011 Garrett ...................... G01S 5/12
455/456.2
2016/0202344 A1* 7/2016 Sanderovich ......... H04W 64/00
455/456.1
(Continued)

FOREIGN PATENT DOCUMENTS

CN          108476073 A * 8/2018 ........... H04B 7/0695
WO    WO-2020197583 A1 * 10/2020

OTHER PUBLICATIONS

Devoti F., et al., "Mm-Wave Initial Access: A Context Information Overview", 2018 IEEE 19th International Symposium on "A World of Wireless, Mobile and Multimedia Networks", (WOWMOM), IEEE, Jun. 12, 2018 (Jun. 12, 2018), XP033394328, pp. 1-9, DOI: 10.1109/WOWMOM.2018.8449790 [retrieved on Aug. 28, 2018] Section III.

(Continued)

*Primary Examiner* — Michael K Phillips
(74) *Attorney, Agent, or Firm* — Arent Fox, LLP

(57) ABSTRACT

The present disclosure includes a method, apparatus, and computer readable medium for wireless communications for determining, at a first node, first beam orientation information for a second node to select one or more beams for beam training with a third node, determining, at the first node, second beam orientation information for the third node to select one or more of beams for beam training with the second node, transmitting, to the second node, the first beam orientation information, and transmitting, to the third node, the second beam orientation information.

28 Claims, 6 Drawing Sheets

(51) Int. Cl.
  *H04W 72/044* (2023.01)
  *H04W 72/04* (2023.01)
  *H04W 80/02* (2009.01)
  *H04W 16/28* (2009.01)

(52) U.S. Cl.
  CPC ......... *H04W 16/28* (2013.01); *H04W 72/042* (2013.01); *H04W 72/046* (2013.01); *H04W 72/0413* (2013.01); *H04W 80/02* (2013.01)

(58) Field of Classification Search
  CPC ........... H04W 72/0413; H04W 72/042; H04W 72/046; H04W 80/02
  See application file for complete search history.

(56) References Cited

U.S. PATENT DOCUMENTS

| | | | |
|---|---|---|---|
| 2017/0195215 A1* | 7/2017 | Gomadam | H04B 7/088 |
| 2018/0115958 A1 | 4/2018 | Raghavan et al. | |
| 2018/0159603 A1* | 6/2018 | Kim | H04B 7/0617 |
| 2019/0097712 A1 | 3/2019 | Singh et al. | |
| 2019/0222279 A1* | 7/2019 | Xi | H04B 7/0408 |
| 2019/0268939 A1* | 8/2019 | Yang | H04W 74/08 |
| 2019/0306829 A1* | 10/2019 | Abedini | H04W 68/02 |
| 2019/0369201 A1* | 12/2019 | Akkarakaran | G01S 5/10 |
| 2020/0022040 A1* | 1/2020 | Chen | H04W 76/27 |
| 2020/0045715 A1* | 2/2020 | Li | H04W 72/121 |
| 2020/0059867 A1* | 2/2020 | Haghighat | H04W 52/262 |
| 2021/0021536 A1* | 1/2021 | Ganesan | H04W 72/1278 |
| 2021/0329416 A1* | 10/2021 | Li | H04B 17/318 |
| 2022/0039080 A1* | 2/2022 | Khoryaev | H04W 4/40 |

OTHER PUBLICATIONS

International Search Report and Written Opinion—PCT/US2020/064726—ISA/EPO—dated Apr. 13, 2021.

* cited by examiner

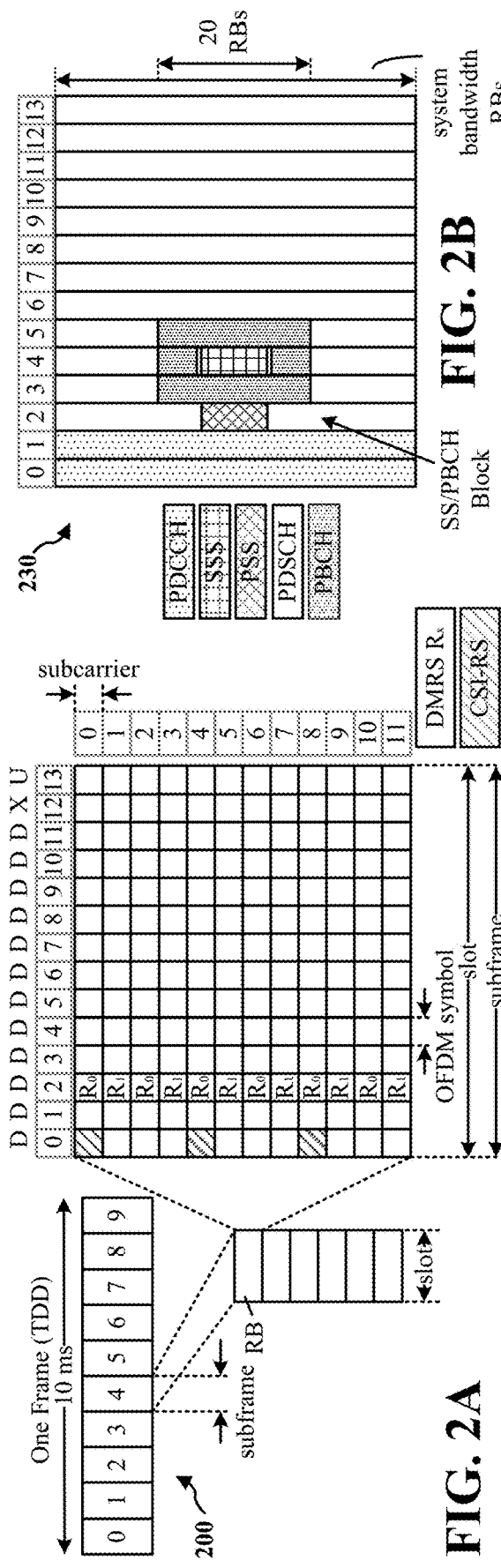
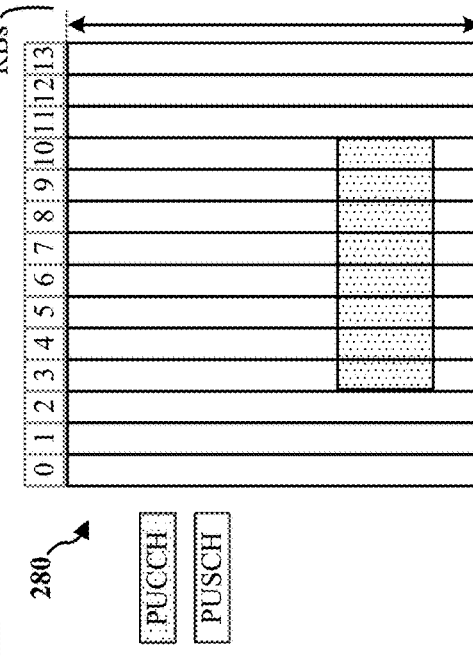
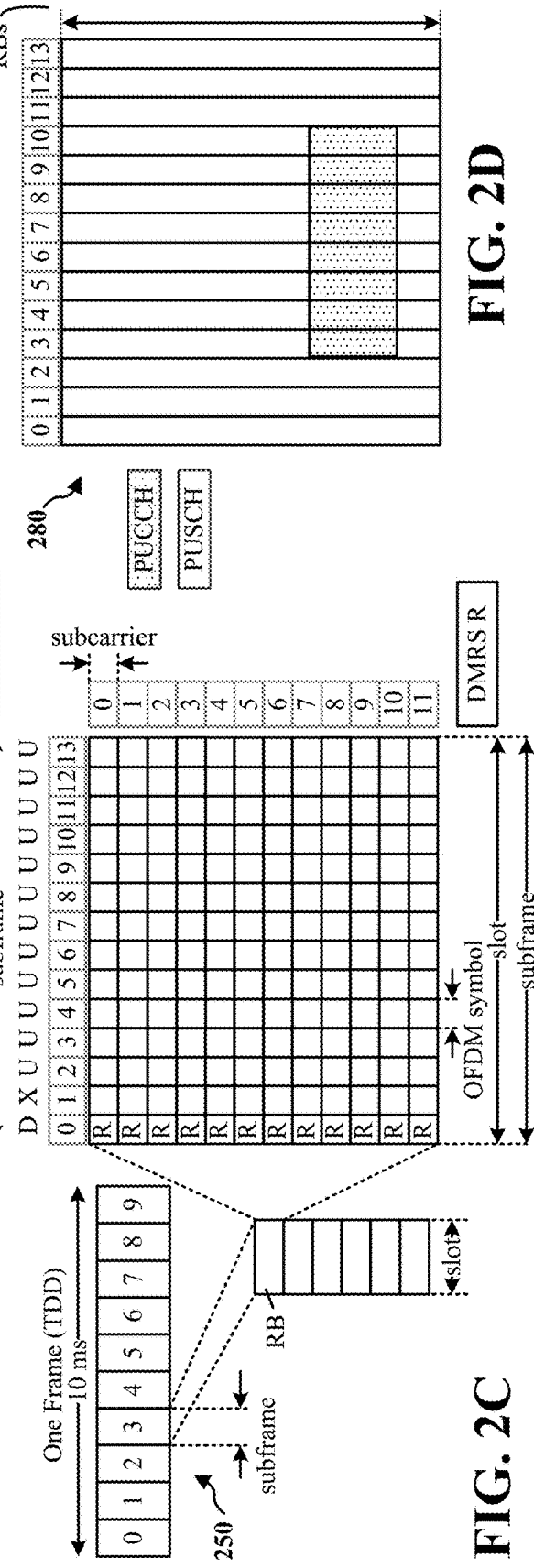
FIG. 2A
FIG. 2B
FIG. 2C
FIG. 2D

TECHNIQUES FOR SPATIAL RELATION INDICATION BASED ON BEAM ORIENTATION

CROSS-REFERENCE TO RELATED APPLICATION(S)

This application claims the benefit of U.S. Provisional Application Ser. No. 62/948,032, entitled "TECHNIQUES FOR SPATIAL RELATION INDICATION BASED ON BEAM ORIENTATION" and filed on Dec. 13, 2019, which is expressly incorporated by reference herein in its entirety.

BACKGROUND

The present disclosure relates generally to communication systems, and more particularly, to spatial relation indication based on beam orientation.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Due to the increasing demand for wireless communications, there is a desire to improve the efficiency of wireless communication network techniques.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a first node, comprising determining, at the first node, first beam orientation information for a second node to select one or more beams for beam training with a third node. The method may further include determining, at the first node, second beam orientation information for the third node to select one or more of beams for beam training with the second node. The method may further include transmitting, to the second node, the first beam orientation information. The method may further include transmitting, to the third node, the second beam orientation information.

A further example implementation includes an apparatus corresponding to a first node for wireless communications comprising a memory and at least one processor in communication with the memory. The at least one processor may be configured to determine, at the first node, first beam orientation information for a second node to select one or more beams for beam training with a third node. The at least one processor may be configured to determine, at the first node, second beam orientation information for the third node to select one or more of beams for beam training with the second node. The at least one processor may be configured to transmit, to the second node, the first beam orientation information. The at least one processor may be configured to transmit, to the third node, the second beam orientation information.

An additional example implementation includes an apparatus for wireless communications. The apparatus may include means for determining, at the first node, first beam orientation information for a second node to select one or more beams for beam training with a third node. The apparatus may further include means for determining, at the first node, second beam orientation information for the third node to select one or more of beams for beam training with the second node. The apparatus may further include means for transmitting, to the second node, the first beam orientation information. The apparatus may further include means for transmitting, to the third node, the second beam orientation information.

A further example implementation includes computer-readable medium storing computer code executable by a processor for wireless communications at a network entity comprising code for determining, at the first node, first beam orientation information for a second node to select one or more beams for beam training with a third node, determining, at the first node, second beam orientation information for the third node to select one or more of beams for beam training with the second node, transmitting, to the second node, the first beam orientation information, and transmitting, to the third node, the second beam orientation information.

In some aspects, the beam orientation information may include at least one of a beam shape and a beam direction, or the beam shape and the beam direction relative to a beam associated with a reference signal.

In some aspects, the second node corresponds to a gNB and the third node corresponds to a user equipment (UE), and wherein the first beam orientation information indicates the beam shape and the beam direction from the gNB to the UE and indicates to the gNB a beam selection for beam training with the UE, and the second beam orientation information indicates the beam shape and the beam direction from the UE to the gNB and indicates to the UE another beam selection scheme for beam training with the gNB.

In some aspects, the second node corresponds to a first UE and the third node corresponds to a second UE, and wherein the first beam orientation information indicates the beam shape and the beam direction from the first UE to the second UE and indicates to the first UE a beam selection for beam training with the second UE, and the second beam orientation information indicates the beam shape and the beam direction from the second UE to the first UE and indicates to the second UE another beam selection scheme for beam training with the first UE.

In some aspects, the method, apparatus, and non-transitory computer-readable medium may further determine the beam direction, wherein determining the beam direction includes receiving location information of the second node and the third node; and identifying, based on the location information, the beam direction as an absolute beam direction corresponding to a defined angular direction irrespective of a current beam of the second node or the third node, or a relative beam direction to the current beam of the second node or the third node.

In some aspects, the location information is received from a location management function or directly from the second node and the third node, and wherein the location information corresponds to three-dimensional positioning information.

In some aspects, identifying the beam direction as the relative beam direction for the first beam orientation information is further based on a two or three dimensional angular difference between an angle from the second node to the first node and an angle from the second node to the third node.

In some aspects, identifying the beam direction as the relative beam direction for the second beam orientation information is further based on a two or three dimensional angular difference between an angle from the third node to the first node and an angle from the third node to the second node.

In some aspects, the method, apparatus, and non-transitory computer-readable medium may further determine, by the first node, a direction of a current serving beam used by the second node to communicate with the first node, based on beam-related information from the second node to fine-tune the relative beam direction for the first beam orientation information.

In some aspects, the method, apparatus, and non-transitory computer-readable medium may further determine, by the first node, a direction of a current serving beam used by the third node to communicate with the first node, based on beam-related information from the third node to fine-tune the relative beam direction for the second beam orientation information.

In some aspects, the method, apparatus, and non-transitory computer-readable medium may further determine the beam shape of the first beam orientation based at least on one of a pathloss or interference consideration for the second node, wherein the beam shape corresponds to a beam width or beam shape information including side-lope suppression or beam gain over a defined sphere direction, and determine the beam shape of the second beam orientation based at least on one of a pathloss or interference consideration for the third node, wherein the beam shape corresponds to a beam width or beam shape information including side-lope suppression or beam gain over a defined sphere direction.

In some aspects, the first beam orientation information triggers selection by the second node of one or more beams for beam-training with the third node based at least on a current orientation of the second node.

In some aspects, the second beam orientation information triggers selection by the third node of one or more beams for beam-training with the second node based at least on a current orientation of the third node.

In some aspects, the first beam orientation information and the second beam orientation information is transmitted via one or more of a downlink control information (DCI), a radio resource control (RRC) signaling, or a medium access control (MAC) control element (MAC-CE), or via one or more of the sidelink equivalents.

In some aspects, at least a portion of first beam orientation information or second beam orientation information is sent on an uplink or downlink communication channel corresponding to a Uu interface or an equivalent corresponding to a sidelink interface, and where the first beam orientation information or the second beam orientation information is transmitted to a relay node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
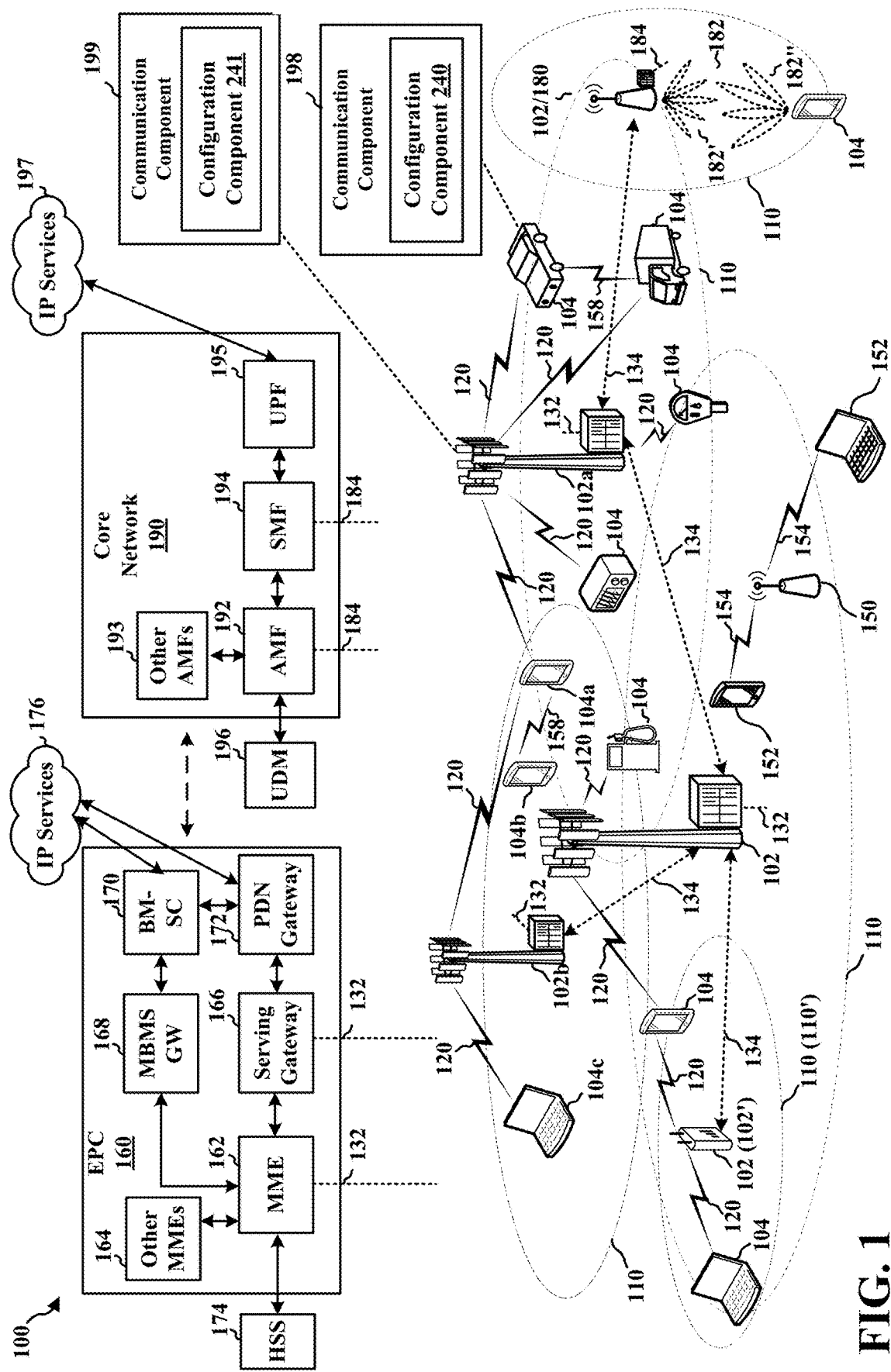
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present aspects relate to a spatial relation indication based on beam orientation. Specifically, initial beams may be identified via a beam-sweep procedure (e.g., during synchronization/random access channel (RACH) procedure, which may be similar to a P1-like beam-training procedure), and may be further refined by beam training via refined beam sweeping (e.g., using channel state information reference signal (CSI-RS) on the downlink and/or sounding reference signal (SRS) on the uplink). For example, on the downlink, the beam training procedure may be defined according to stages P1/P2/P3. During P1, for instance, a gNB may sweep all corresponding broad beams (e.g., using synchronization signal block (SSB)) and a UE may sweep all corresponding broad beams, in order to find the best transmit and receive broad beams. During P2, the gNB may sweep all the narrow beams of the best transmit beam from P1, and the UE measures them using the best receive broad beam from P1, in order to find the best narrow beam for transmission.

For transmit and receive channels (physical downlink shared channel (PDSCH), physical uplink shared channel (PUSCH), etc), one or more beam(s) to be used may be indicated as one (or more) of the above identified beams (e.g., SSB or CSI-RS and/or SRS). Specifically, quasi co-location (QCL) type-D may be defined to indicate a spatial relation or beam. If two channels and/or reference signals are QCL'ed via Type-D, then they may use the same beam (i.e., the same spatial relation). For DL channels, the beams may be indicated by a transmission configuration indication (TCI) with QCL Type-D, indicating which reference signal (e.g., SSB/CSI-RS) may be used to determine the transmit beam(s) on the downlink. For uplink channels, the beams are indicated by SpatialRelationInfo indication, indicating which reference signal (e.g., SSB/CSI-RS or SRS) may be used to determine the transmit beam(s) on the uplink. Alternatively the TCI framework can be extended to the uplink as well, including optionally other QCL types in addition to the QCL Type-D which is equivalent to the SpatialRelationInfo. Hence, as a transmitter may not be aware of a receiver's beam shapes and/or codebook, and vice-versa, it may be desirable to select actual beam-shapes and a beam codebook.

As such, to reduce beam-training latency and resource overhead when side-information (e.g., UE/gNB 3D position or current orientation or the beam related information) is available, this invention inputs to the beam training procedure beam orientation information which includes a beam shape and a beam direction from one node to another node either during normal communication or prior to a RACH procedure between the two nodes. For example, instead of indicating a beam corresponding to a reference signal (e.g., SSB/CSI-RS and/or SRS)", a beam orientation may be indicated, where the beam orientation may be identified by the beam shape and the beam direction. In some aspects, combinations of both the above approaches, e.g., beam shape and direction relative to that of the indicated beam (i.e., the one corresponding to reference signal).

Specifically, in an implementation, a first node may determine first beam orientation information for a second node to select one or more beams for beam training with a third node, determine second beam orientation information for the third node to select one or more of beams for beam training with the second node, transmit, to the second node, the first beam orientation information, and transmit, to the third node, the second beam orientation information.

FIG. 1 is a diagram illustrating an example of a wireless communications system and an access network 100 configured for selecting resources in a resource selection window. The wireless communications system (also referred to as a wireless wide area network (WWAN)) includes base stations 102, UEs 104, an Evolved Packet Core (EPC) 160, and another core network 190 (e.g., a 5G Core (5GC)).

In certain aspects, the UE 104 may be configured to operate a communication component 198 and/or a configuration component 240 to determine first beam orientation information for a second node to select one or more beams for beam training with a third node, determine second beam orientation information for the third node to select one or more of beams for beam training with the second node, transmit, to the second node, the first beam orientation information, and transmit, to the third node, the second beam orientation information.

In one example, a serving gNB (e.g., base station 102a) may be in communication with a first UE (e.g., UE 104a), but the UE may be handing-over to a second gNB (e.g., base station 102b). The serving gNB may inform the first UE the beam orientation information, beam shape and beam direction pointing in the direction from the first UE to the second gNB. The serving gNB may also inform the second gNB the beam orientation information, beam shape and beam direction pointing in the direction from the second gNB to the first UE. In some aspects, the serving gNB does not need to inform the second gNB the beam orientation information (i.e., beam shape and beam direction pointing in the direction from the second gNB to the first UE), if the P1-like beam-training for RACH is implemented. This may be because the second gNB has many other UEs and corresponding SSB beam sweeping (i.e., P1-like beam-training procedure for UEs to RACH) cannot be reduced just for the first UE. In the above example, handover latency and resource overhead may be reduced.

In another example, when a first UE (e.g., UE 104a) and a second UE (e.g., base station 102b) may be engaged in an active communication session, and the first UE and a third UE (e.g., UE 104c) may also be engaged in an active communication session, the third UE may desire to engage in an active communication session with the second UE. In some aspects, the first UE may inform a second UE the beam orientation information, beam-shape and beam direction pointing in a direction from the second UE to the third UE. In some aspects, the first UE may inform the third UE the beam orientation information, beam-shape and beam direction pointing the direction from the third UE to the second UE. In the above example, establishment of a sidelink communication between the second and third UE may be expedited and resource overhead may be reduced.

In a further example, a serving gNB (e.g., base station 102a) may be communicating with a first UE (e.g., UE 104a), as well as a second UE (e.g., UE 102b), but then the first UE requests to communicate with the second UE. In some aspects, the serving gNB may inform the first UE the beam orientation information, beam-shape and beam direction pointing in the direction from the first UE to the second UE. In some aspects, the gNB may inform the second UE the beam orientation information, beam-shape and beam direction pointing in the direction from second UE to the first UE. In the above example, establishment of a sidelink communication between the first and second UE may be expedited and resource overhead may be reduced.

In some aspects, the present implementations may apply to at least three nodes (e.g., include a UE and/or a gNB), or any combination (e.g., three UEs). Further, the present implementations may apply to transmit and/or receive of any communication channel (Uu, sidelink, etc.).

To determine beam direction, a gNB may initially obtain three dimensional positioning information of the second gNB and the first UE. Local positioning may be obtained, for example, using location management function (LMF) in RAN if the LMF is co-located with the gNB. Otherwise, the gNB may request the positioning information from LMF. In some aspects, the gNB may obtain the position information individually from the second gNB and the first UE if the second gNB and the first UE are aware of their respective three dimensional positions.

The gNB may then base the three dimensional positions to determine the beam directions from the first UE and the second gNB and from the second gNB to the first UE. For example, the beam direction may be indicated as absolute (e.g., using azimuth and elevation angles, such as, north east at 10 degrees elevation), or relative to a direction of a beam that the first UE is using the reception/transmission (e.g., 20 degrees more elevation compared to the UEs reception beam which corresponds to the first gNB SSB beam). For an absolute indication, the UE may need determine its current orientation (e.g., based on sensor orientation capability). For a relative indication, the UE may need determine its current orientation (e.g., based on sensor orientation capability).

In some aspects, a relative direction can be derived by the three dimensional angle difference between the first UE to the gNB angle and the first UE to the second gNB angle.

Thus, the first gNB may not need aware of the UE's current orientation. In some aspects (e.g., the current UE beam that serves gNB1 does not point to gNB1 directly), gNB1 may need know (a) the UE current orientation and (b) the UE beam-related info (e.g., the direction of each UE beam per panel, under UE LCS, where LCS=Local Coordination System) to determine the direction of the current UE beam that serves gNB1, in order to fine-tune the relative 3D angles (e.g., by adding an 3D offset to the angle difference estimated as above.

To determine beam shape, a gNB may base such determination on pathloss estimated for the first UE, for example (e.g., narrower beam to compensate higher pathloss). The gNB may also determine beam shape based on interference considerations (e.g., use narrower beam if many other UEs are being served in a similar geographical area). Beam shape may correspond to a beam width, or in some aspects, a side-lope suppression, or beam gains over certain sphere directions.

In an example procedure, a first gNB may request that a second gNB reports its orientation and/or its three-dimensional positioning information. The first gNB may further request that the first UE report its orientation (e.g., periodically or on demand of the first gNB's command) and/or three-dimensional positioning information. The first gNB may determine that the first UE is to be handed over to the second gNB (e.g., due to coverage or the first gNB being overloaded). The first gNB may determine the beam-direction and beam-shape as described herein. The first gNB may inform the first UE beam orientation information (i.e., beam shape and direction from the first UE to the second gNB) in an radio resource control (RRC) reconfiguration message prior to the UE RACHing to the second gNB.

Based on the beam orientation information from the first gNB and its current orientation, the first UE may select one or more of beams to sweep and to listen to the second gNB's synchronization signal blocks (SSBs), in order to RACH to the second gNB. This reduces the P1-like beam-training (e.g., as part of the first UE RACHing to the second gNB), because the first UE beam-set for beam sweeping is reduced. In some cases, the first UE and the second gNB may be able to skip P1-like beam training for the RACH procedure, for example, line-of-sight (LOS), accurate orientation three-dimensional positioning information. The first gNB may inform the second gNB the beam orientation information (i.e., beam shape and direction from the second gNB to the first UE). The second gNB may configure UE with the P2 narrow beams (e.g., using channel state information reference signal (CSI-RS)). Thus, both handover latency and resource overhead may be reduced.

In some implementations, the side-information signaling (e.g., UE/gNB three-dimensional positioning or current orientation or the beam related information) may be sent over the appropriate protocol/interface. For example, the gNB may obtain the first UE's 3D three-dimensional positioning from a location management function via NR Positioning Protocol A (PPa), periodically or on demand. The second UE may obtain the first UE's three-dimensional positioning from the first UE over sidelink (e.g., data payload, SL MAC-CE/PUSCH equivalents), periodically or on demand. The first UE may report its current orientation information to the gNB via Uu interface (e.g., MAC-CE/PUSCH), periodically or at gNB's request. The first UE may report its current orientation information to the second UE via a sidelink (e.g., SL MAC-CE/PUSCH equivalents), periodically or at the second UE's request. The first UE may report its beam-related information (e.g., panel, codebook/beam) to the gNB via Uu interface. The first UE may report its beam-related information (e.g., panel, codebook/beam) to the second UE via sidelink interface.

In some implementations, the beam orientation information may be transmitted as or within a beam-orientation indication (beam shape plus beam direction). For example, a quasi-co-location (QCL) type indication in which spatial info may be indicated by an absolute beam shape plus beam direction instead of a QCL-D source (i.e., CSI-RS/SSB or SRS), or a QCL-D source (i.e., CSI-RS/SSB or SRS) and a relative beam shape plus beam direction relative to the beam for this QCL-D source, or if the entity determining the beam shape plus beam direction has all the beam-related information (e.g., all panel and codebook/beam information), then the beam-orientation indication may be defined as the beam index(s) into the entire codebook pool (e.g., indicating one or more beams).

For the Uu interface, downlink channels may support transmission configuration indication (TCI) states to indicate the above QCL types. For uplink channels, attributes similar to spatial relation information may be supported to indicate the above QCL types. For the sidelink interface, a TCI state and/or an attribute similar to spatial relation information may be supported to indicate the above QCL types. The beam orientation indication (e.g., beam shape plus beam direction) may be carried in an RRC/media access control (MAC) control element (CE)/downlink control information (DCI) (e.g., if over Uu) or SL RRC/MAC-CE/DCI equivalents (e.g., if over sidelink).

In some implementations, a quantization of the beam-orientation indication may be supported. For example, a resolution (e.g., number of bits) for beam direction angles and beam-widths may be fixed pre-sets or pre-configured. The beam shape and direction may be indicated as an index into a fixed list of possible beam-shapes and beam-directions, respectively. A device may select the beam from its codebook pool that best matches the requested shape and direction. Or, if the entire codebook of a device is available to the requester, then the requester may send the beam index(s) into the device to indicate the beam shape plus beam direction.

Correspondingly, in certain aspects, the network entity 102 (e.g., base station) may be configured to operate a communication component 199 and/or a configuration component 241 to facilitate communication with the UE 104.

The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D include diagrams of example frame structures and resources that may be utilized in communications between the base stations 102, the UEs 104, and/or the secondary UEs (or sidelink UEs) 110 described in this disclosure. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more frames. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu *15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
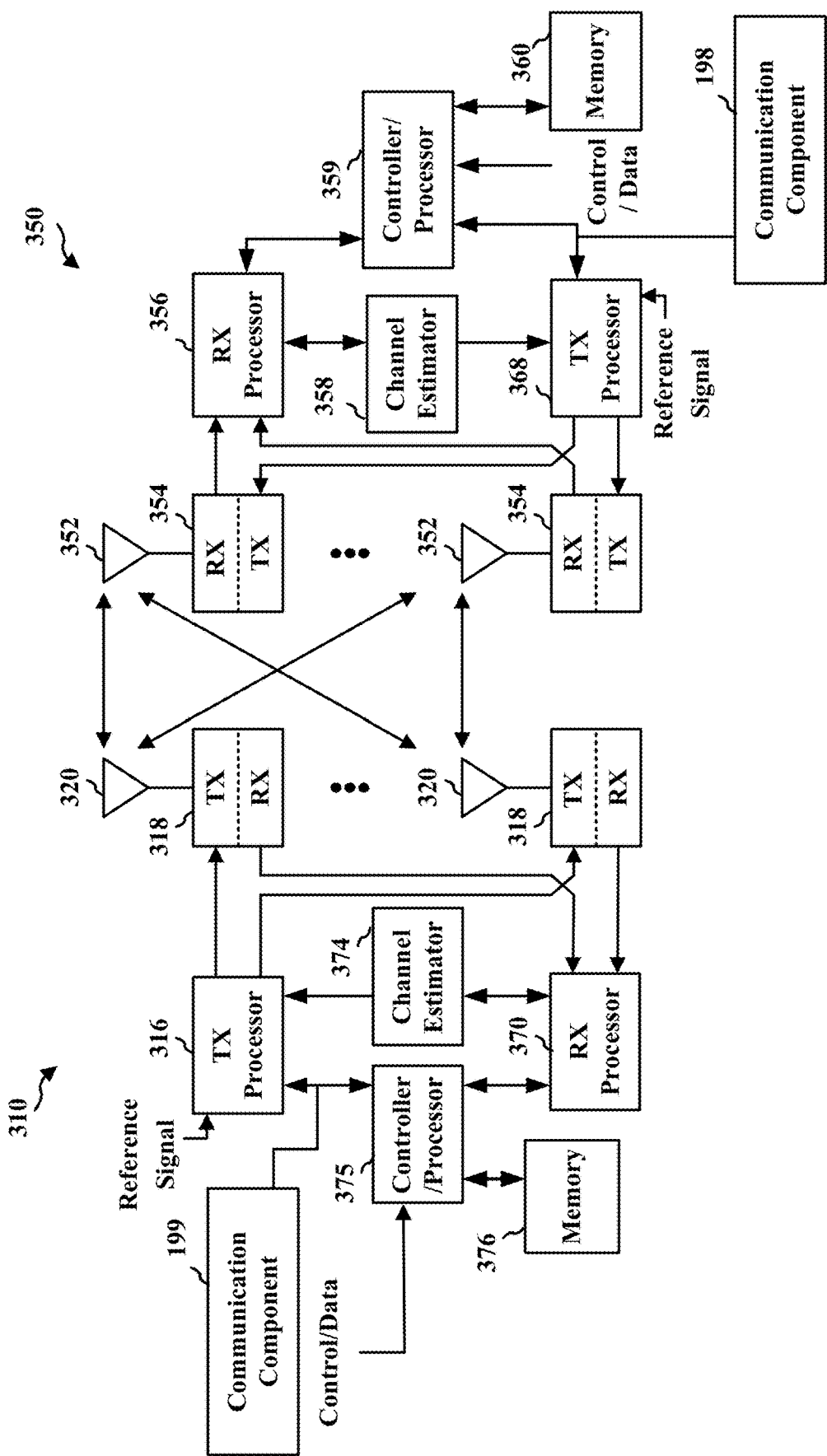
FIG. 3 is a diagram illustrating an example of a base station and user equipment (UE) in an access network.

FIG. 3 is a block diagram of a base station 310 in communication with a UE 350 in an access network, where the base station 310 may be an example implementation of base station 102 and where UE 350 may be an example implementation of UE 104. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with communication component 198 of FIG. 1.

At least one of the TX processor 316, the RX processor 370, and the controller/processor 375 may be configured to perform aspects in connection with communication component 199 of FIG. 1.

Figure 4:
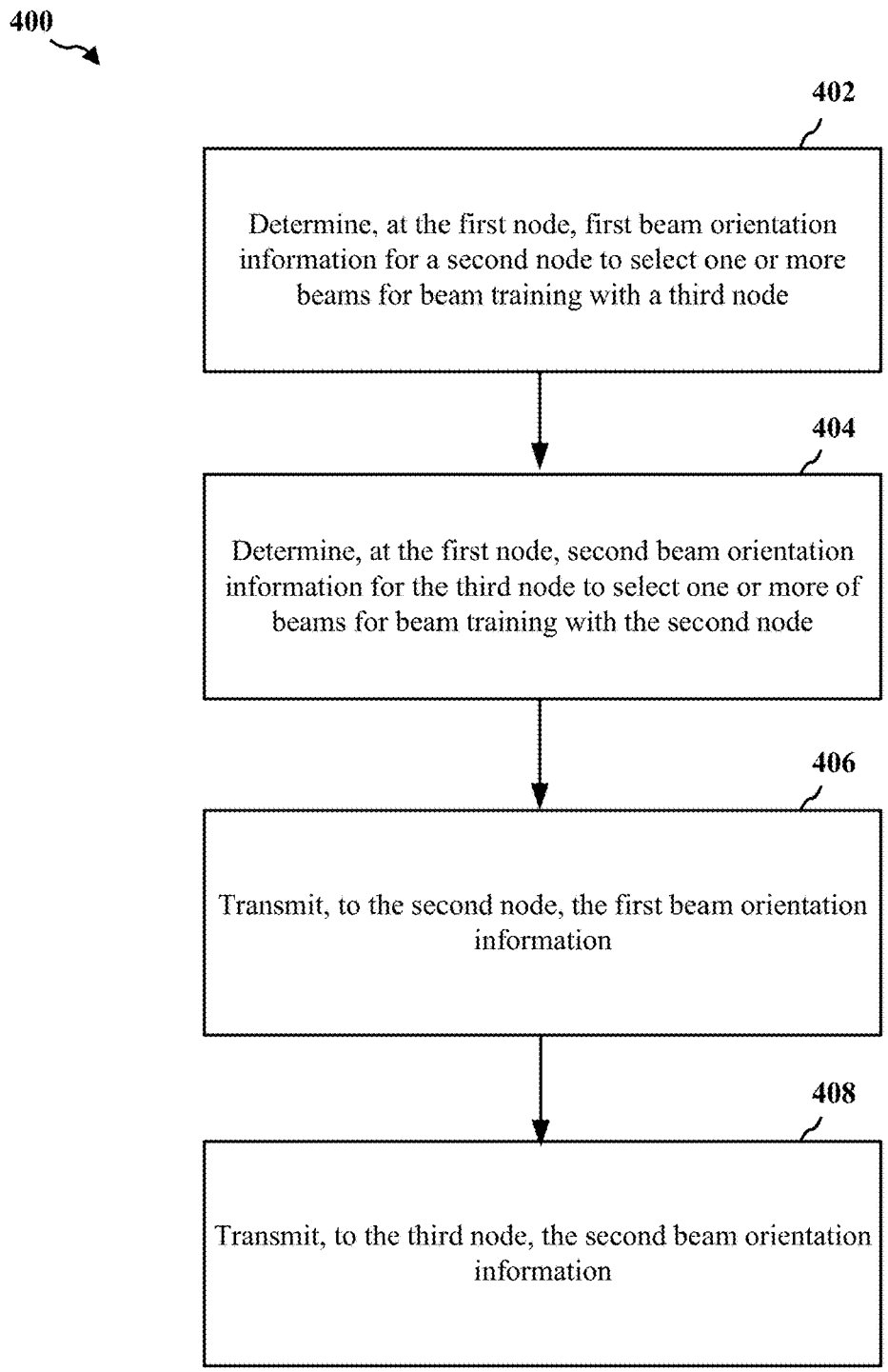
FIG. 4 is a flowchart of a method of wireless communication, and more specifically default path loss reference signal determination for PUCCH and SRS.

FIG. 4 is a flowchart 400 of a method of wireless communication at a first node. The method may be performed by a UE (e.g., the UE 104; the apparatus 350; the controller/processor 359, which may include the memory 360, processor(s) 512, which may include the memory 516, modem 540 and which may be the entire UE 104 or a component of the UE 104, such as the TX processor 368, the RX processor 356, and/or the transceiver 502) in combination with the communication component 198/configuration component 240.

At 402, method 400 includes determining, at the first node, first beam orientation information for a second node to select one or more beams for beam training with a third node. In an aspect, the UE 104 and/or the communication component 198/configuration component 240 may be configured to determine, at the first node, first beam orientation information for a second node to select one or more beams for beam training with a third node. As such, the UE 104 and/or the communication component 198/configuration component 240, e.g., in conjunction with controller/processor 359, which may include the memory 360, processor(s) 512, which may include the memory 516, modem 540, TX processor 368, and transceiver 502 may define a means for determining, at the first node, first beam orientation information for a second node to select one or more beams for beam training with a third node.

At 404, method 400 includes determining, at the first node, second beam orientation information for the third node to select one or more of beams for beam training with the second node. In an aspect, the UE 104 and/or the communication component 198/configuration component 240 may be configured to determine, at the first node, second beam orientation information for the third node to select one or more of beams for beam training with the second node. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for determining, at the first node, second beam orientation information for the third node to select one or more of beams for beam training with the second node.

At 406, method 400 includes transmitting, to the second node, the first beam orientation information. In an aspect, the UE 104 and/or the communication component 198/configuration component 240 may be configured to transmit, to the second node, the first beam orientation information. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for transmitting, to the second node, the first beam orientation information.

At 408, method 400 includes transmitting, to the third node, the second beam orientation information. In an aspect, the UE 104 and/or the communication component 198/configuration component 240 may be configured to transmit, to the third node, the second beam orientation information. As such, the UE 104 and/or the communication component 198/configuration component 240, e.g., in conjunction with controller/processor 359, which may include the memory 360, processor(s) 512, which may include the memory 516, modem 540, RX processor 356, and transceiver 502 may define a means for transmitting, to the third node, the second beam orientation information.

In some aspects, the beam orientation information may include at least one of a beam shape and a beam direction, or the beam shape and the beam direction relative to a beam associated with a reference signal. For example, the beam shapes in the first and second beam orientation information may be different, one may be for the second node and the other is for the third node.

In some aspects, the second node may corresponds to a gNB and the third node may correspond to a UE, and wherein the first beam orientation information may indicate the beam shape and the beam direction from the gNB to the UE and may indicate to the gNB a beam selection scheme for beam training with the UE, and the second beam orientation information may indicate the beam shape and the beam direction from the UE to the gNB and indicate to the UE another beam selection scheme for beam training with the gNB.

In some aspects, the second node may correspond to a first UE and the third node corresponds to a second UE, and the first beam orientation information may indicate the beam shape and the beam direction from the first UE to the second UE and indicates to the first UE a beam selection scheme for beam training with the second UE, and the second beam orientation information indicate the beam shape and the beam direction from the second UE to the first UE and indicate to the second UE another beam selection scheme for beam training with the first UE.

The method 400 may optionally further include determining the beam direction, wherein determining the beam direction includes receiving location information of the second node and the third node, identifying, based on the location information, the beam direction as an absolute beam direction corresponding to a defined angular direction irrespective of a current beam of the second node or third node, or a relative beam direction to the current beam of the second node or third node.

In some aspects, the location information may be received from a location management function or directly from the second node and the third node, and wherein the location information may correspond to three-dimensional positioning information.

In some aspects, identifying the beam direction as the relative beam for the second beam orientation information may be further based on a two or three dimensional angular difference between an angle from the third node to the first node and an angle from the third node to the second node. For example, the angular difference may be in azimuth or in elevation or in both.

In some aspects, identifying the beam direction as the relative beam for the second beam orientation information is further based on a two or three dimensional angular difference between an angle from the third node to the first node and an angle from the third node to the second node. For example, the angular difference may be in azimuth or in elevation or in both.

The method 400 may optionally further include determining, by the first node, a direction of a current serving beam used by the third node to communicate with the first node, based on the beam-related information from the third node to estimate the relative beam direction.

The method 400 may optionally further include determining the beam shape based at least on one of a pathloss for the third node or interference information, wherein the beam shape may correspond to a beam width or beam shape information including side-lope suppression or beam gain over a defined sphere direction.

The method 400 may optionally further include determining, by the first node, a direction of a current serving beam used by the third node to communicate with the first node, based on the beam-related information from the third node to fine-tune the relative beam direction for the second beam orientation information.

In some aspects, the first beam orientation information may trigger selection by the second node of one or more beams for beam-training with the third node based at least on a current orientation.

In some aspects, the second beam orientation information may trigger selection by the third node of one or more beams for beam-training with the second node based at least on a current orientation. There may be two kinds of orientation: (1) beam-orientation information which includes beam shape and beam direction and may be used for a beam selection and (2) UE/gNB orientation defined as a three-dimensional rotation angle with respect to a reference antenna coordination system.

In some aspects, the first beam orientation information and the second beam orientation information is transmitted via one or more of a DCI, a RRC signaling, or a MAC-CE, an uplink control information (UCI), or via one or more of the sidelink equivalents.

In some aspects, at least a portion of the first beam orientation information and/or the second beam orientation information is sent on an uplink or downlink communication channel corresponding to a Uu interface or an equivalent corresponding to a sidelink interface. In some aspects, the beam orientation information may be sent to a relay node. The relay node may then transmit the first beam orientation information and/or the second beam orientation information to the second node or third node, respectively.

In some aspects, the first node may correspond to the second node or third node. Also, the second node may correspond to the third node.

Figure 5:
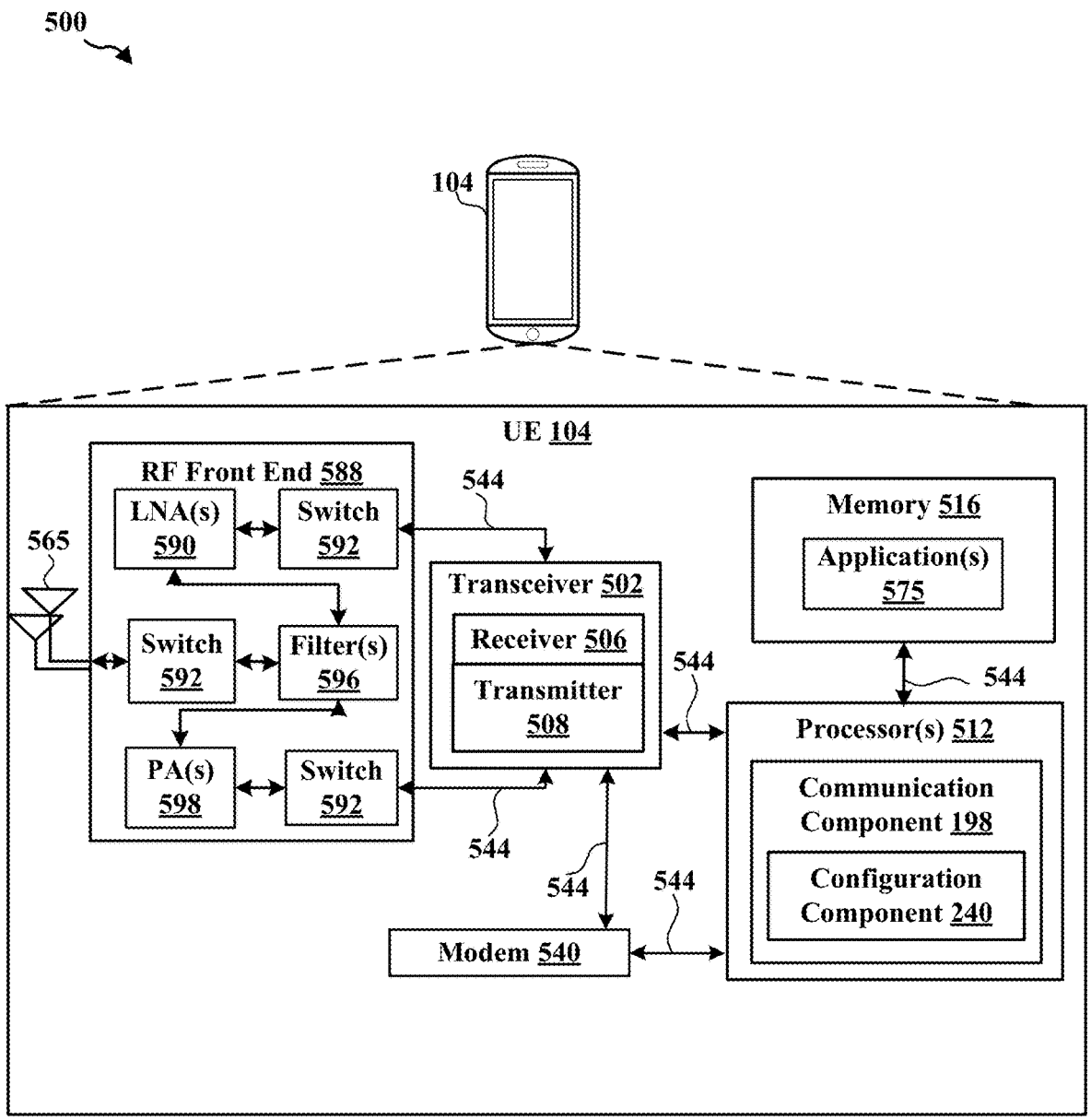
FIG. 5 is a block diagram illustrating an example of a UE, in accordance with various aspects of the present disclosure.

Referring to FIG. 5, one example of an implementation of UE 104 may include a variety of components, some of which have already been described above and are described further herein, including components such as one or more processors 512 and memory 516 and transceiver 502 in communication via one or more buses 544, which may operate in conjunction with modem 540 and/or communication component 198 for prioritizing uplink transmissions in NR-U.

In an aspect, the one or more processors 512 can include a modem 540 and/or can be part of the modem 540 that uses one or more modem processors. Thus, the various functions related to communication component 198 may be included in modem 540 and/or processors 512 and, in an aspect, can be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 540 associated with communication component 198 may be performed by transceiver 502.

Also, memory 516 may be configured to store data used herein and/or local versions of applications 575 or communicating component 542 and/or one or more of its subcomponents being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes defining communication component 198 and/or one or more of its subcomponents, and/or data associated therewith, when UE 104 is operating at least one processor 512 to execute communication component 198 and/or one or more of its subcomponents.

Transceiver 502 may include at least one receiver 506 and at least one transmitter 508. Receiver 506 may include hardware and/or software executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one base station 102. Additionally, receiver 506 may process such received signals, and also may obtain measurements of the signals, such as, but not limited to, Ec/Io, signal-to-noise ratio (SNR), reference signal received power (RSRP), received signal strength indicator (RSSI), etc. Transmitter 508 may include hardware and/or software executable by a processor for transmitting data, the code comprising instructions and being stored in a memory (e.g., computer-readable medium). A suitable example of transmitter 508 may including, but is not limited to, an RF transmitter.

Moreover, in an aspect, UE 104 may include RF front end 588, which may operate in communication with one or more antennas 565 and transceiver 502 for receiving and transmitting radio transmissions, for example, wireless communications transmitted by at least one base station 102 or wireless transmissions transmitted by UE 104. RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that UE 104 can communicate with, for example, one or more base stations 102 or one or more cells associated with one or more base stations 102. In an aspect, for example, modem 540 can configure transceiver 502 to operate at a specified frequency and power level based on the UE configuration of the UE 104 and the communication protocol used by modem 540.

In an aspect, modem 540 can be a multiband-multimode modem, which can process digital data and communicate with transceiver 502 such that the digital data is sent and received using transceiver 502. In an aspect, modem 540 can be multiband and be configured to support multiple frequency bands for a specific communications protocol. In an aspect, modem 540 can be multimode and be configured to support multiple operating networks and communications protocols. In an aspect, modem 540 can control one or more components of UE 104 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 512 may correspond to one or more of the processors described in connection with the UE in FIG. 3. Similarly, the memory 516 may correspond to the memory described in connection with the UE in FIG. 3.

Figure 6:
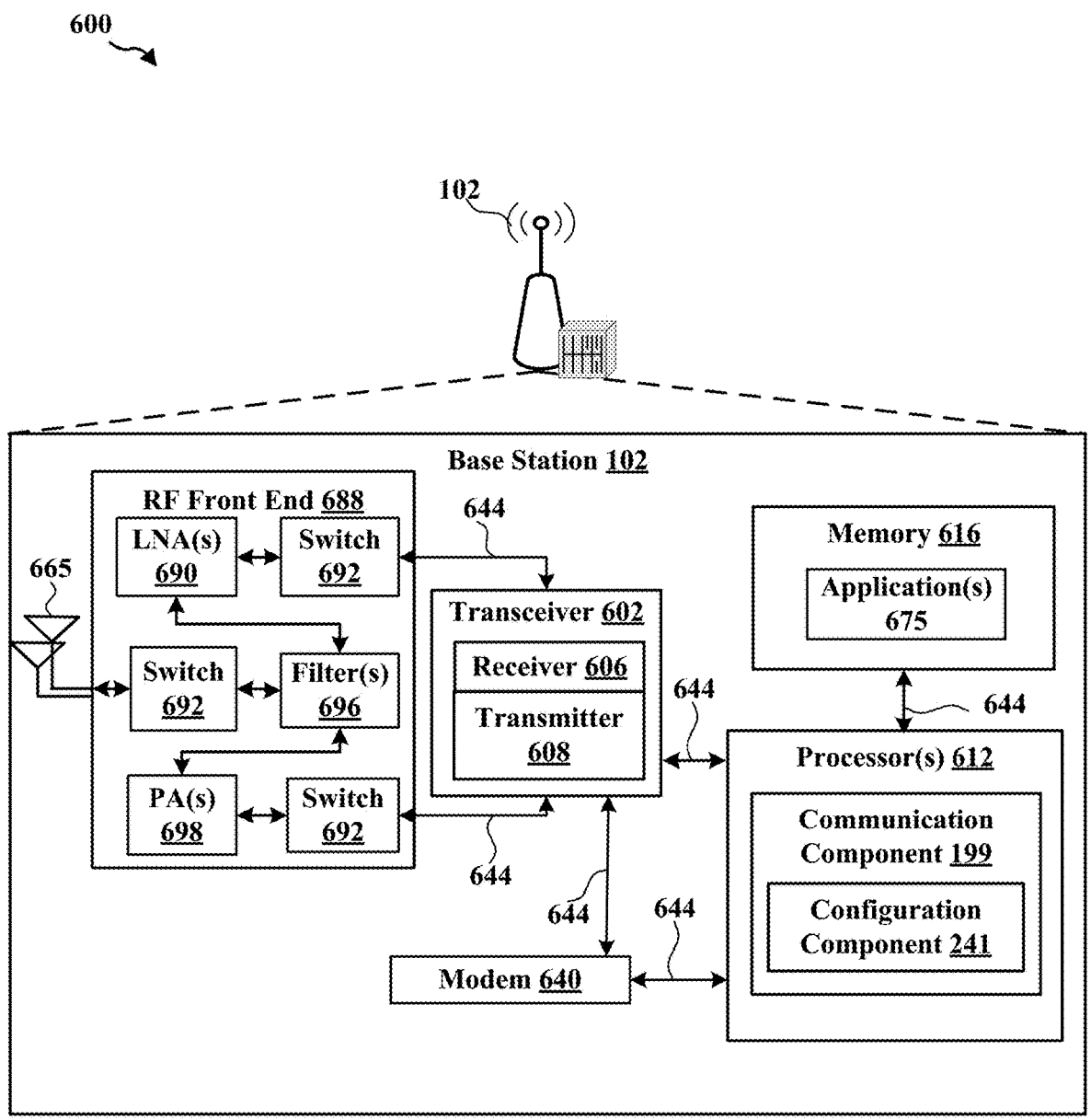
FIG. 6 is a block diagram illustrating an example of a base station, in accordance with various aspects of the present disclosure.

Referring to FIG. 6, one example of an implementation of base station 62 (e.g., a base station 62, as described above) may include a variety of components, some of which have already been described above, but including components such as one or more processors 612 and memory 616 and transceiver 602 in communication via one or more buses 644, which may operate in conjunction with modem 640 and communication component 199 for communicating reference signals.

The transceiver 602, receiver 606, transmitter 608, one or more processors 612, memory 616, applications 675, buses 644, RF front end 688, LNAs 690, switches 692, filters 696, PAs 698, and one or more antennas 665 may be the same as or similar to the corresponding components of UE 64, as described above, but configured or otherwise programmed for base station operations as opposed to UE operations.

In an aspect, the processor(s) 612 may correspond to one or more of the processors described in connection with the base station in FIG. 3. Similarly, the memory 616 may correspond to the memory described in connection with the base station in FIG. 3.

An Appendix is included that is part of the present application and provides additional details related to the various aspects of the present disclosure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications at a first node, comprising:
   determining, at the first node, first beam orientation information for a second node to select one or more beams for beam training with a third node;
   determining, at the first node, second beam orientation information for the third node to select one or more of beams for beam training with the second node, wherein the first beam orientation information includes a first beam shape and the second beam orientation information includes a second beam shape;
   identifying the first beam shape based at least on one of a pathloss or interference consideration for the second node, wherein the first beam shape corresponds to a beam width or beam shape information including sidelobe suppression or beam gain over a defined sphere direction;
   identifying the second beam shape based at least on one of a pathloss or interference consideration for the third node, wherein the second beam shape corresponds to a beam width or beam shape information including sidelobe suppression or beam gain over a defined sphere direction;
   transmitting, to the second node, the first beam orientation information; and
   transmitting, to the third node, the second beam orientation information.

2. The method of claim 1, wherein the first beam orientation information and the second beam orientation information includes at least one of:
   a beam direction,
   the first beam shape and the beam direction relative to a beam associated with a reference signal, or
   the second beam shape and the beam direction relative to the beam associated with the reference signal.

3. The method of claim 2, wherein the second node corresponds to a gNB and the third node corresponds to a user equipment (UE), and wherein the first beam orientation information indicates the first beam shape and the beam direction from the gNB to the UE and indicates to the gNB a beam selection for beam training with the UE, and the second beam orientation information indicates the second beam shape and the beam direction from the UE to the gNB and indicates to the UE another beam selection scheme for beam training with the gNB.

4. The method of claim 2, wherein the second node corresponds to a first UE and the third node corresponds to a second UE, and wherein the first beam orientation information indicates the first beam shape and the beam direction from the first UE to the second UE and indicates to the first UE a beam selection for beam training with the second UE, and the second beam orientation information indicates the second beam shape and the beam direction from the second UE to the first UE and indicates to the second UE another beam selection scheme for beam training with the first UE.

5. The method of claim 2, further comprising determining the beam direction, wherein determining the beam direction includes:

receiving location information of the second node and the third node; and identifying, based on the location information, the beam direction as an absolute beam direction corresponding to a defined angular direction irrespective of a current beam of the second node or the third node, or a relative beam direction to the current beam of the second node or the third node.

6. The method of claim 5, wherein the location information is received from a location management function or directly from the second node and the third node, and wherein the location information corresponds to three-dimensional positioning information.

7. The method of claim 5, wherein identifying the beam direction as the relative beam direction for the first beam orientation information is further based on a two or three dimensional angular difference between an angle from the second node to the first node and an angle from the second node to the third node.

8. The method of claim 5, wherein identifying the beam direction as the relative beam direction for the second beam orientation information is further based on a two or three dimensional angular difference between an angle from the third node to the first node and an angle from the third node to the second node.

9. The method of claim 5, further comprising determining, by the first node, a direction of a current serving beam used by the second node to communicate with the first node, based on beam-related information from the second node to fine-tune the relative beam direction for the first beam orientation information.

10. The method of claim 5, further comprising determining, by the first node, a direction of a current serving beam used by the third node to communicate with the first node, based on beam-related information from the third node to fine-tune the relative beam direction for the second beam orientation information.

11. The method of claim 1, wherein the first beam orientation information triggers selection by the second node of one or more beams for beam-training with the third node based at least on a current orientation of the second node.

12. The method of claim 1, wherein the second beam orientation information triggers selection by the third node of one or more beams for beam-training with the second node based at least on a current orientation of the third node.

13. The method of claim 1, wherein the first beam orientation information and the second beam orientation information is transmitted via one or more of a downlink control information (DCI), a radio resource control (RRC) signaling, or a medium access control (MAC) control element (MAC-CE), an uplink control information (UCI), or via one or more of the sidelink equivalents.

14. The method of claim 1, wherein at least a portion of the first beam orientation information or the second beam orientation information is sent on an uplink or downlink communication channel corresponding to a Uu interface or an equivalent corresponding to a sidelink interface, and wherein the first beam orientation information or the second beam orientation information is transmitted to a relay node.

15. An apparatus corresponding to a first node for wireless communication, comprising:
a transceiver;
a memory configured to store instructions; and
at least one processor communicatively coupled with the transceiver and the memory, wherein the at least one processor is configured to:

determine, at the first node, first beam orientation information for a second node to select one or more beams for beam training with a third node;

determine, at the first node, second beam orientation information for the third node to select one or more of beams for beam training with the second node, wherein the first beam orientation information includes a first beam shape and the second beam orientation information includes a second beam shape;

identify the first beam shape based at least on one of a pathloss or interference consideration for the second node, wherein the first beam shape corresponds to a beam width or beam shape information including side-lobe suppression or beam gain over a defined sphere direction;

identify the second beam shape based at least on one of a pathloss or interference consideration for the third node, wherein the second beam shape corresponds to a beam width or beam shape information including side-lobe suppression or beam gain over a defined sphere direction;

transmit, to the second node, the first beam orientation information; and transmit, to the third node, the second beam orientation information.

16. The apparatus of claim 15, wherein the first beam orientation information and the second beam information includes at least one of:
a beam direction,
the first beam shape and the beam direction relative to a beam associated with a reference signal, or
the second beam shape and the beam direction relative to the beam associated with the reference signal.

17. The apparatus of claim 16, wherein the second node corresponds to a gNB and the third node corresponds to a user equipment (UE), and wherein the first beam orientation information indicates the first beam shape and the beam direction from the gNB to the UE and indicates to the gNB a beam selection for beam training with the UE, and the second beam orientation information indicates the second beam shape and the beam direction from the UE to the gNB and indicates to the UE another beam selection scheme for beam training with the gNB.

18. The apparatus of claim 16, wherein the second node corresponds to a first UE and the third node corresponds to a second UE, and wherein the first beam orientation information indicates the first beam shape and the beam direction from the first UE to the second UE and indicates to the first UE a beam selection for beam training with the second UE, and the second beam orientation information indicates the second beam shape and the beam direction from the second UE to the first UE and indicates to the second UE another beam selection scheme for beam training with the first UE.

19. The apparatus of claim 16, wherein the at least one processor is further configured to determine the beam direction, and wherein to determine the beam direction, the at least one processor is further configured to:

receive location information of the second node and the third node; and identify, based on the location information, the beam direction as an absolute beam direction corresponding to a defined angular direction irrespective of a current beam of the second node or the third node, or a relative beam direction to the current beam of the second node or the third node.

20. The apparatus of claim 19, wherein the location information is received from a location management function or directly from the second node and the third node, and wherein the location information corresponds to three-dimensional positioning information.

21. The apparatus of claim 19, wherein the beam direction as the relative beam direction for the first beam orientation information is further identified based on a two or three dimensional angular difference between an angle from the second node to the first node and an angle from the second node to the third node.

22. The apparatus of claim 19, wherein the beam direction as the relative beam direction for the second beam orientation information is further identified based on a two or three dimensional angular difference between an angle from the third node to the first node and an angle from the third node to the second node.

23. The apparatus of claim 19, wherein the at least one processor is further configured to determine, by the first node, a direction of a current serving beam used by the second node to communicate with the first node, based on beam-related information from the second node to fine-tune the relative beam direction for the first beam orientation information.

24. The apparatus of claim 19, wherein the at least one processor is further configured to determine, by the first node, a direction of a current serving beam used by the third node to communicate with the first node, based on beam-related information from the third node to fine-tune the relative beam direction for the second beam orientation information.

25. The apparatus of claim 15, wherein the first beam orientation information triggers selection by the second node of one or more beams for beam-training with the third node based at least on a current orientation of the second node.

26. The apparatus of claim 15, wherein the second beam orientation information triggers selection by the third node of one or more beams for beam-training with the second node based at least on a current orientation of the third node.

27. An apparatus corresponding to a first node for wireless communication, comprising:
means for determining, at the first node, first beam orientation information for a second node to select one or more beams for beam training with a third node;
means for determining, at the first node, second beam orientation information for the third node to select one or more of beams for beam training with the second node, wherein the first beam orientation information includes a first beam shape and the second beam orientation information includes a second beam shape;
means for identifying the first beam shape based at least on one of a pathloss or interference consideration for the second node, wherein the first beam shape corresponds to a beam width or beam shape information including side-lobe suppression or beam gain over a defined sphere direction;
means for identifying the second beam shape based at least on one of a pathloss or interference consideration for the third node, wherein the second beam shape corresponds to a beam width or beam shape information including side-lobe suppression or beam gain over a defined sphere direction;
means for transmitting, to the second node, the first beam orientation information; and
means for transmitting, to the third node, the second beam orientation information.

28. A non-transitory computer-readable medium storing computer code executable by a processor of a first node for wireless communications comprising code for:
determining, at the first node, first beam orientation information for a second node to select one or more beams for beam training with a third node;
determining, at the first node, second beam orientation information for the third node to select one or more of beams for beam training with the second node, wherein the first beam orientation information includes a first beam shape and the second beam orientation information includes a second beam shape:
identifying the beam first shape based at least on one of a pathloss or interference consideration for the second node, wherein the first beam shape corresponds to a beam width or beam shape information including side-lobe suppression or beam gain over a defined sphere direction;
identifying the second beam shape based at least on one of a pathloss or interference consideration for the third node, wherein the second beam shape corresponds to a beam width or beam shape information including side-lobe suppression or beam gain over a defined sphere direction;
transmitting, to the second node, the first beam orientation information; and
transmitting, to the third node, the second beam orientation information.

\* \* \* \* \*